Figure 1:
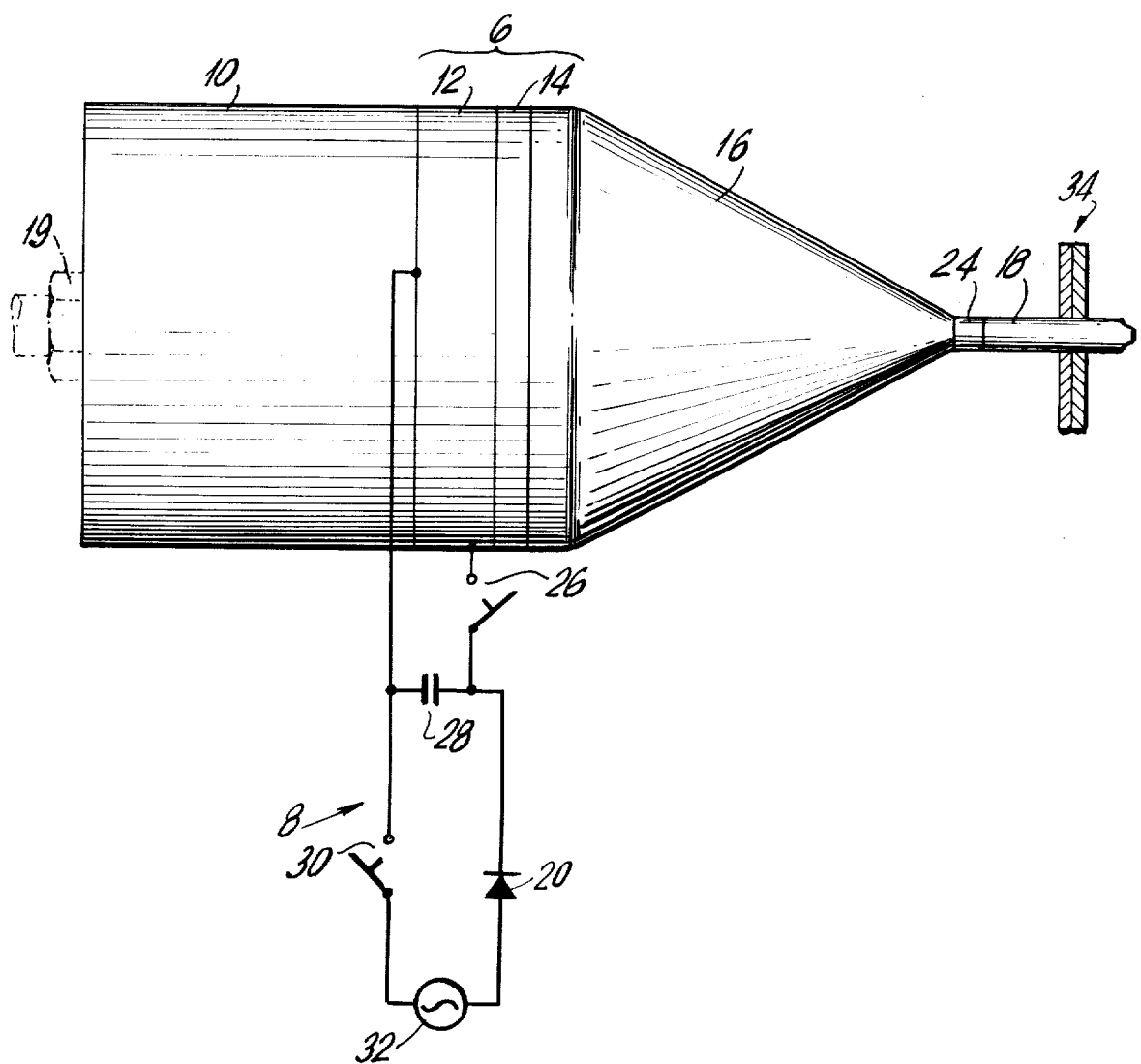

United States Patent [19]
Leftheris

[11] 3,945,109
[45] Mar. 23, 1976

[54] METHOD AND APPARATUS FOR DRIVING INTERFERENCE-FIT FASTENERS

[75] Inventor: Basil P. Leftheris, East Northport, N.Y.

[73] Assignee: Grumman Aerospace Corporation, Bethpage, N.Y.

[22] Filed: July 11, 1974

[21] Appl. No.: 487,747

Related U.S. Application Data

[63] Continuation-in-part of Ser. No. 244,402, April 17, 1972, Pat. No. 3,824,824, which is a continuation-in-part of Ser. No. 863,045, Oct. 2, 1969, abandoned.

[52] U.S. Cl. .................................. 29/525; 72/56
[51] Int. Cl.² .................................. B23P 19/02
[58] Field of Search ............ 29/525, 243.54; 72/56; 227/9

[56] References Cited
UNITED STATES PATENTS

| | | | |
|---|---|---|---|
| 3,092,165 | 6/1963 | Harvey | 72/56 |
| 3,224,086 | 12/1965 | Balamuth | 29/243.54 |
| 3,279,228 | 10/1966 | Brower | 72/56 |
| 3,646,791 | 3/1972 | Leftheris | 72/56 |
| 3,704,506 | 12/1972 | Orr et al. | 29/243.54 |
| 3,824,824 | 7/1974 | Leftheris | 72/56 |

*Primary Examiner*—Milton S. Mehr
*Attorney, Agent, or Firm*—Morgan, Finnegan, Pine, Foley & Lee

[57] ABSTRACT

Method and apparatus for driving an interference-fit fastener by electromagnetically generating a stress wave, conditioning the stress wave, and passing the stress wave through the fastener, the stress wave is reflected from the remote free end of the fastener to impart a high velocity to the fastener relative to the surface of its receiving aperture to overcome the frictional forces existing there between and draw the interference fastener into the receiving aperture.

11 Claims, 5 Drawing Figures

METHOD AND APPARATUS FOR DRIVING INTERFERENCE-FIT FASTENERS

This application is a continuation-in-part of copending application Ser. No. 244,402 filed Apr. 17, 1972, now U.S. Pat. No. 3,824,824, which is a continuation-in-part of application Ser. No. 863,045, filed Oct. 2, 1969, now abandoned. Other related patents are U.S. Pat. No. 3,646,791, issued Mar. 7, 1972, entitled METHOD AND APPARATUS FOR DEFORMING A METAL WORKPIECE, FOR UPSETTING RIVETS AND FOR BLIND RIVETING, and U.S. Pat. No. 3,731,370, issued May 8, 1973 entitled METHOD AND APPARATUS FOR DEFORMING A METAL WORKPIECE, FOR UPSETTING RIVETS AND FOR BLIND RIVETING.

This invention relates to a method and apparatus for driving metal, interference-fit fasteners. More specifically, this invention relates to a method and apparatus for converting electromagnetic energy into a stress wave which is conditioned, focussed and applied to an interference-fit fastener to drive the fastener into its receiving aperture. A "fastener" is defined as an element for joining two components, e.g., a pin. The term "interference-fit" is used to indicate a difference in diameter between the aperture which receives the fastener and the fastener itself, with the fastener having the greater diameter.

There are many metal structures which require joints formed with interference fasteners. Generally, the driving of interference fasteners is carried out with various hammering tools. Large yokes with high pressure hydraulic cylinders are also used. These techniques have the following disadvantages:

1. The fastener may yield and expand so that it is prevented from being completely driven into the workpiece or even if so driven it may cause galling and gouging.

2. For metal fasteners with large interferences, e.g., 0.005–0.008 inch in 0.750 inch diameter apertures, hammering methods are ineffective and dangerous. The large hydraulic cylinder apparatus can be used if space is available to provide the necessary operating clearance and support. This is necessary for metal structures that cannot support the extremely large load applied by the hydraulic cylinder (20–60,000 p.s.i.).

3. Many applications require a joint in the middle of a large structure where neither a hammering device nor a hydraulic cylinder apparatus can be used.

4. There are also many applications which require temporary insertion of fasteners and it is thereafter necessary to drive them out without damaging the apertures. This is extremely difficult and often impossible to do with a hammering device or a hydraulic cylinder apparatus.

5. Often it is required to attach one element to another element with an interference fastener, e.g., a shaft to a bearing, this is difficult with the present fastening tools.

It is an object of the present invention to provide a method and apparatus for driving interference fasteners which overcomes the disadvantages of the prior art techniques.

It is a further object of the present invention to provide a method and apparatus which utilizes stress waves to install interference-fit fasteners.

It is a further object of the present invention to provide a method and apparatus for driving interference-fit fasteners without deformation thereof.

It is a still further object of the present invention to provide a positive and reliable method and apparatus for driving interference-fit fasteners.

It is a still further object of the present invention to provide a compact and portable system for driving interference-fit fasteners.

Other objects, aspects, and advantages of the present invention will be apparent from the detailed description considered with the drawing.

The method of the present invention includes the steps of electromagnetically generating a stress wave, conditioning the stress wave by transforming its amplitude and shape, passing the conditioned stress wave through an interference-fit fastener resulting in reflection of the stress wave from the remote end of the interference fastener causing the application of sufficient velocity to the remote free end to overcome frictional forces and drive the fastener into position within its receiving aperture to join two components.

The apparatus of the present invention includes an energy source connected to a pancake coil, a disc shaped aluminum driver adjacent to the coil, a conditioning or focussing means adjacent to the aluminum driver, and a shock absorbing mechanism positioned to the rear of the coil, as disclosed in applicant's previously mentioned application and patents.

The discharge from the energy source establishes a magnetic field around the coil, this magnetic field in turn induces a current in the aluminum driver. The induced current sets up a magnetic field within the aluminum driver and the interaction of the two magnetic fields causes the generation of a stress wave which is then propagated through the conditioning means and through the interference-fit fastener.

The stress wave generated by the electromagnetic repulsion of two high intensity magnetic fields imparts a high particle velocity in the direction of propagation of the wave and simultaneously increases the stress in the interference-fit fastener. However, in contrast with the teachings of the aforementioned application and patents the interference-fit fastener (workpiece) does not undergo plastic deformation, but rather elastic deformation as will be more fully explained below. The axial momentum of the pin, produced by the propagation of the stress wave through the pin, causes a tensile elongation in the direction of propagation and a contraction at right angles to the direction of propagation. This tensile elongation or expansion is governed by Poisson's ratio which is the ratio between the lateral strain and the direct tensile strain. The stress wave reflected from the remote or free end of the interference fastener is a tension wave and the outward velocity of the free end is doubled to drive or draw the interference fastener into the receiving aperture. It should be noted that unlike conventional pin driving techniques, the present invention does not require the use of a bucking bar or mass in a bucking or support position at the remote end of the pin.

Figure 2:
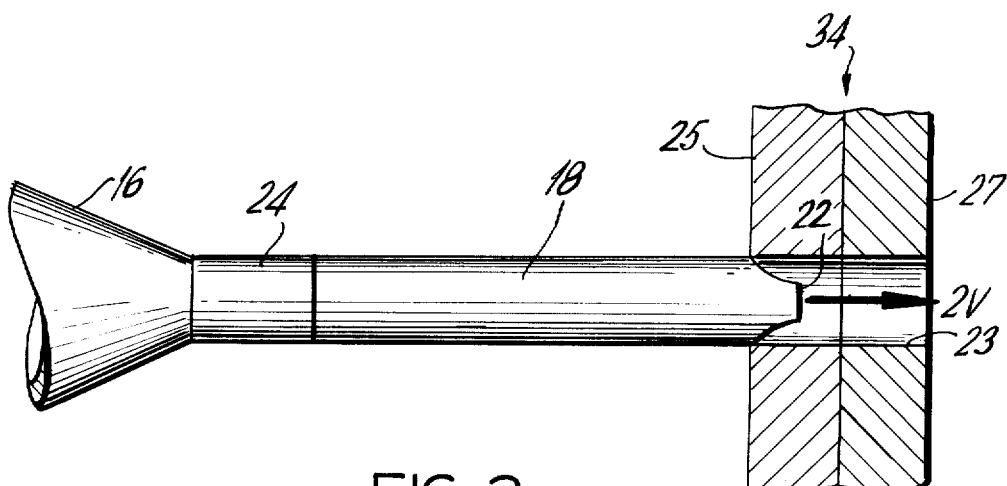
Figure 3A:
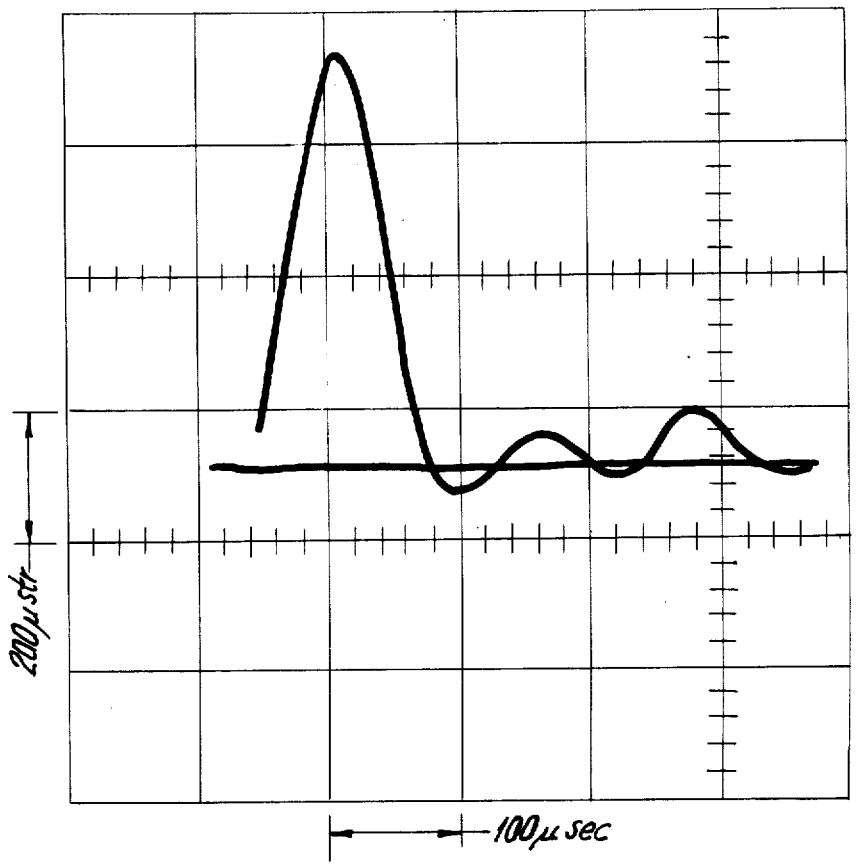

One embodiment of the present invention is illustrated in the drawings, in which:

FIG. 1 is a partial schematic and side elevational view of the apparatus of the present invention;

FIG. 2 is an enlarged view of an interface-fit fastener and joint, showing how the interference-fit fastener is driven into the receiving aperture of a joint; and FIGS. 3a, b, and c are graphs illustrating an original stress wave prior to conditioning in the conditioning means, the stress wave after conditioning by the conditioning means, and the stress wave as incident upon and reflected from the remote end of the interference-fit fastener, respectively.

Referring to FIG. 1, the apparatus of the present invention includes a power supply 8, a stress wave generator 6, a stress wave conditioning or focussing means 16, and shock absorbing means 10.

The power supply 8 comprises an a.c. energy source 32, a rectifier 20, and switch means 30, all connected in series with a capacitor bank 28, only one capacitor is shown, which is then electrically connected by switch means 26 to the stress wave generator 6. The stress wave generator 6 includes a pancake coil 12 and an aluminum driver 14 arranged in side by side coaxial relationship. The stress wave generated in the aluminum driver 14 passes through the conditioning or focussing means 16, through its integral tip 24, and into the interference-fit fastener, shown as a pin 18, to be installed in aperture 23 formed in members 25 and 27.

Initially, the capacitor bank 28 is charged by the energy source 32 when switch 30 is closed. After the capacitor bank is charged, switch 30 is opened and switch means 26 is closed thereby transmitting a high amperage current pulse, of short duration, through the pancake coil 12. The duration of the current pulse is on the order of about 100 microseconds. A high intensity magnetic field is set up around the coil 12 and this field intersects the aluminum driver 14, which acts as a one turn secondary winding of a transformer, thereby inducing a current therein. The induced current flowing through the surface of the driver 14 sets up a high intensity magnetic field within the driver 14. The electromagnetic repulsion established by the interaction of the two high intensity magnetic fields generates a stress wave in the aluminum driver 14 which is propagated through the conditioning means 16 and tip 24 into the pin 18.

The device as described above has been successfully used to drive stainless steel and titanium pins. The apparatus of the present invention can be fixed in a frame with a pin being fed thereto or it can be used portably and held by the user. The only structural difference required by the two uses is that in the portable machine a bolt is threaded into the center of the base of the conditioning means 16 and extends through the shock absorber 10 having a nut 19 to hold the components in tight relationship; when used in a frame a stud extends through the shock absorber 10 and into the conditioning means 16 in order to keep the apparatus centered.

In one test, an apparatus according to the present invention was placed in a frame and used in a pin driving operation, NAS (National Aeronautical Standard) stainless steel pins were successfully driven. The capacitor bank 28 had a low inductance and with the coil 12 connected and electromagnetically coupled to the aluminum driver 14 had an operating frequency of 5.0 KHz. A high amperage electrical current was fed to the coil 12 by the capacitor bank 28. The coil 12 included 18 turns of a rectangularly shaped copper member ½ inch by 0.080 inch. The coil 12 was potted in polyurethane compound equivalent to 60 durometer rubber having ample elasticity, the dimensions of the coil being 1½ inches thick by 6 inches in diameter and having a 1 inch diameter circular hole through the center. The driver 14 consisted of 6061-T4 aluminum, ¼ inch thick by 6 inches in diameter and having a 1 inch circular hole through the center. The 6061-T4 aluminum was used since it is of good conductivity and sufficient strength to withstand the forces produced. The conditioning or focussing means 16 which was constructed of 4340 hardened steel, has a ½ inch by 6 inch diameter cylindrical base section leading into a truncated cone 6 inches long and having a ¾ inch diameter top to which a ½ inch long cylindrical section was attached. The tip 24 of the conditioning means 16 was placed in contact with the pin 18. The pins were made of steel or titanium and had the following dimensions 1 inch dia. × 1 inch length ¾ inch dia. ×3½ inches length and 1⅛ inch dia. × 3 inches length. The shock absorber 10 consisted of a series of rubber pads attached to the coil 12. A centering stud of 1 inch diameter was inserted into the circular holes of the various components and into a 1 inch diameter by 1 inch deep hole in the base of the conditioning means 16. The voltage required to drive these different size pins was respectively 7, 8 and 9 KV.

In another test, which is a mere variation from that described above, the apparatus was used by hand, rather than in a frame, for the pin driving operation. The only variations from the above example consisted of a change in dimensions of the components. The diameter of the coil 12 was increased to 9 inches, as was the diameter of the aluminum driver 14. All other dimensions including those of the conditioning means 16 remained the same. Also, instead of a centering stud, a threaded bolt was fitted into the base of the conditioning means 16 and secured by nut 19 and washer (not shown) at the end of the shock absorber 10.

In determining the dimensions, material, and other parameters of the conditioning means, the momentum, continuity, and stress strain relationships used in the uniaxial propagation of stress wave pulses in solid bars was utilized.

Consider an element of a conditioning or focussing means wherein:

$dx_o$ = the initial thickness of the element;
$dx$ = the final thickness of the element and equals $(dx/dx_o), dx_o$
$A$ = the cross sectional area of the element;
$s$ = the stress in the direction of motion;
$\epsilon$ = the strain in the direction of motion; and
$x$ = the distance from the left end of the element.

By definition, strain equals the final thickness less the initial thickness divided by the initial thickness, or $$\epsilon = \frac{dx - dx_o}{dx_o} = \frac{\delta x}{\delta x_o} - 1 \tag{1}$$

Partially differentiating equation (1) with respect to time, we obtain:

$$\frac{\delta \epsilon}{\delta t} = \frac{\delta}{\delta t}\left(\frac{\delta x}{\delta x_o} - 1\right) = \frac{\delta}{\delta x_o}\left(\frac{\delta x}{\delta t}\right) = \frac{\delta u}{\delta x_o} \tag{2}$$

where $u = (\delta x/\delta t)$ the particle velocity.

Since $s = E\epsilon$, equation (2) can be rewritten as:

$$\frac{\delta s}{\delta t} - E \cdot \frac{\delta u}{\delta x_o} = 0 \tag{3}$$

where $E$ = Young's Modulus of Elasticity.
From Newton's First Law of Physics we have:

$$A\rho dx \cdot \frac{\delta u}{\delta t} = \frac{\delta(As)}{\delta x} \cdot dx \qquad (4)$$

where $\rho$ is the density of the material.
Mass continuity equation can be written as follows:

$$\rho_o A_o dx_o = \rho A dx$$

$\rho_o$ = the initial density of the material
$A_o$ = the initial cross-sectional area of the element
and for $A = A_o$ $$\rho_o dx_o = \rho dx = \rho \frac{\delta x}{\delta x_o} dx_o$$

or $$\rho_o = \rho \frac{\delta x}{\delta x_o} \qquad (5)$$

Substituting for $dx$ in equation (4), we have:

$$\left(A\rho \frac{\delta x}{\delta x_o} dx_o\right) \frac{du}{dt} = \frac{\delta(As)}{\delta x} \left(\frac{\delta x}{\delta x_o}\right) dx_o$$

or $$A\rho \frac{\delta x}{\delta x_o} \cdot \frac{du}{dt} = \frac{\delta(As)}{\delta x} \left(\frac{\delta x}{\delta x_o}\right) = \frac{\delta(As)}{\delta x_o}$$

Substituting from equation (5) we have:

$$A\rho_o \frac{du}{dt} = \frac{\delta(As)}{\delta x_o}$$

or $$\rho_o \frac{\delta u}{\delta t} = \frac{\delta s}{\delta x_o} + \frac{s}{A} \cdot \frac{\delta A}{\delta x_o} \qquad (6)$$

Two configurations were specifically considered for the conditioning means, although other configurations may also be used:
a. an exponential shape governed by the formula:

$$A = A_o e^{-nx_o} \qquad (7)$$

and
b. a conical shape governed by the formula:

$$A = A_o \left[1 - \left(\frac{x_o}{R_o K}\right)\right]^2 \qquad (8)$$

where:
$A_o$ = the area of the larger or left hand end of the conditioning means;
$n$ = a constant to be determined;
$R_o$ = radius of the larger end of the conditioning means;
$x_o$ = the length of the conditioning means; and
$K$ = the tangent of the angle described by the edge of the cone and the base of the cone.
From experimental results we also have the relationship:

$$(du/dt) = m \qquad (9)$$

where $m$ is a constant.
Combining equations (6), (3), (7) and (9), we are able to derive the following equation for the exponentially shaped conditioning means:

$$\frac{s}{s_o} = \frac{1}{ct_A h} \left(\frac{A_o}{A} - 1\right) + \frac{A_o}{A} \qquad (10)$$

where:
$c = \sqrt{E/\rho}$ the speed of sound in the material;
$s_o$ = the stress at the larger end of the conditioning means which is directly related to the energy input at this point;
$s$ = the stress at the smaller end of the conditioning means;
$A$ = the cross sectional area at the smaller end of the conditioning means; and
$t_A$ = the time required for the particle velocity to reach a maximum.
Combining equations (6), (3), (8) and (9), we are able to derive the following equation for the conically shaped conditioning means:

$$\frac{s}{s_o} = \frac{R_o K}{3ct_A} \left(\frac{A_o}{A} - 1\right) + \frac{x_o}{3ct_A} + \frac{A_o}{A} \qquad (11)$$

Taking the case where:
$c$ = 200,000 in./sec.
$t_A$ = 20 × 10$^{-6}$ sec.
$(A_o/A)$ = 11.8
$x_o$ = 4 in., and
$K$ = 1.89.
Utilizing equation (10), we obtain a stress multiplication $(s/s_o)$ = 15.9.
Utilizing equation (11), we obtain a stress multiplication $(s/s_o)$ = 17.
From measurements it was determined that the pressure developed at the electromagnetic coil 12 varied between about 5,000 and 9,000 p.s.i. and therefore an average of 7,000 p.s.i. was used.
Using the cone, the theoretical stress at the pin 18 was determined to be 17 × 7,000 p.s.i. or 119,000 p.s.i.
Using high speed photography it was found that the particle velocity at the small end of the conditioning means 16 was approximately 640 in/sec. Knowing this velocity and using the momentum equation, the stress at the small end of the conditioning means 16 can be calculated:

$$s = (\rho c u/g)$$

where:
$\rho$ = 0.3 lb./cu. in.
$c$ = 20 × 10$^4$ in./sec.
$u$ = 640 in./sec.
$g$ = 32.2 ft./sec.$^2$
therefore
$s$ = 100,000 p.s.i.
This calculated stress compares well with the theoretical stress of 119,000 p.s.i.
The present invention employs stress waves to drive pins. Therefore, without wishing to be bound by theory the phenomenon believed to be occurring in the apparatus of the invention is set forth below.

It is believed that an appreciation of stress wave theory is necessary since much confusion presently exists due to the occasional use of the term stress wave in an imprecise and undisciplined manner.

First of all, it must be understood that stress waves are a distinct pheomenon separate from other energy forms commonly confused with stress waves. Stess waves are a form of energy transfer which cause motion within a solid. If an arbitrary small disturbance is originated within a restricted portion of an elastic solid medium, neighboring portions will soon be set in motion and thrown into states of strain. The portion of the medium which is disturbed at a subsequent instant will not be the same as that which was disturbed initially. *A Treatise on the Mathematical Theory of Elasticity*, A. G. H. Love, Dover Publications (1944).

Stress wave phenomenon is markedly different from rigid dynamics. As set forth by H. Kolsky in *Stress Waves in Solids*, Dover, 486-61098-5 (Introduction):

"In rigid dynamics it is assumed that, when a force is applied to any one point in a body, the resultant stresses set every other point in motion instantaneously and the force can be considered as producing a linear acceleration of the whole body, together with an angular acceleration about its center of gravity. In the theory of elasticity, on the other hand, the body is considered as in equilibrium under the action of applied forces and the elastic deformations are assumed to have reached their static values. These treatments are sufficiently accurate for problems in which the time between the application of a force and the setting up of effective equilibrium is short compared with the times in which the observations are made. When, however, we are considering the effects of forces which are applied for only very short periods of time, or are changing rapidly, the effects must be considered in terms of the propagation of stress waves."

With impact devices a body near the time changing magnetic field is accelerated. Thus, kinetic energy is stored ($\frac{1}{2} mv^2$). Then the body impacts on the workpiece transferring its kinetic energy to deformation.

With rigid dynamics type force application, the force produced by the magnetic field is applied to the workpiece through a medium that possesses fluidity (ability to flow under hydrostatic pressure). Thus, the magnetic pressure acts on the surface of the workpiece as if it were fluid. The workpiece instantly experiences the pressure and it moves according to the classical Newton's law (Force = mass × acceleration).

The effect of the area change on the stress pulse is different from the simple pressure increase it affords for static and rigid-dynamic conditions. Its length, shape and material constants play important roles for the emerging wave that propagates through the pin.

One difference in behaviour, for example, is that the intensification of the pulse is not, in general, equal to the area ratio. That is:

$$\frac{\text{stress output}}{\text{stress input}} \neq \frac{\text{Area input}}{\text{Area output}}$$

Figure 3C:
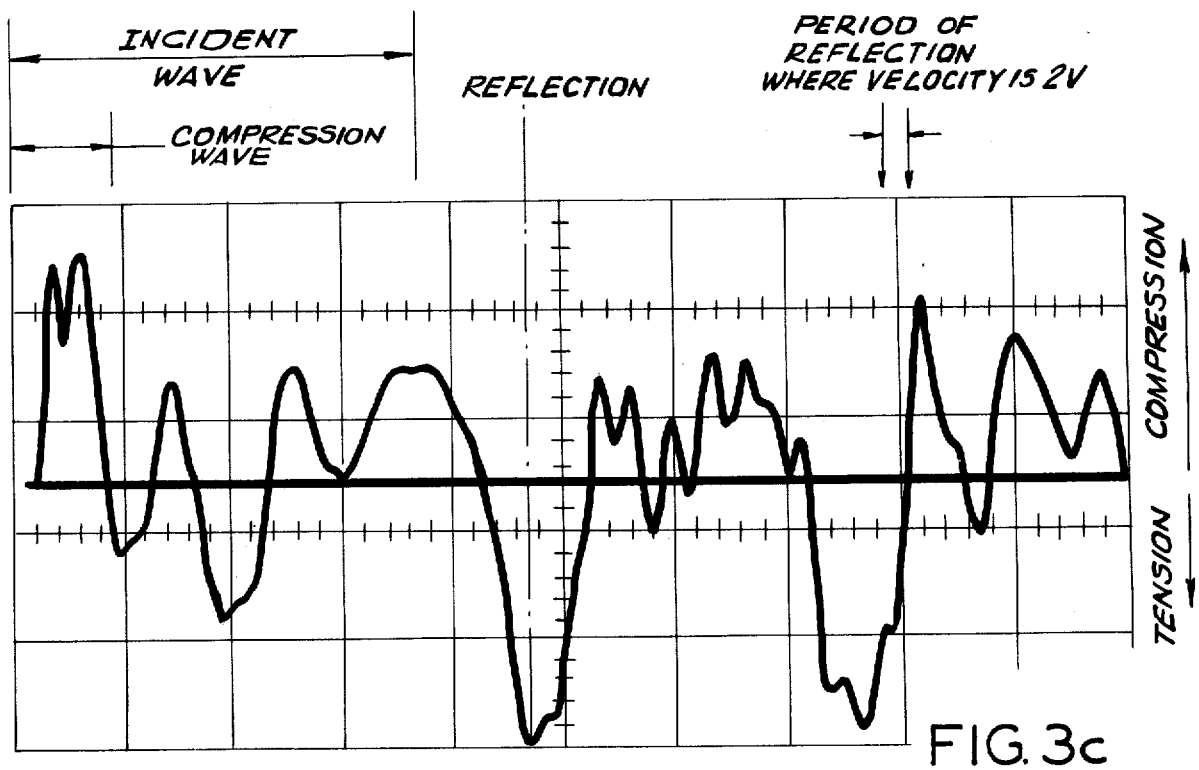
Figure 3B:
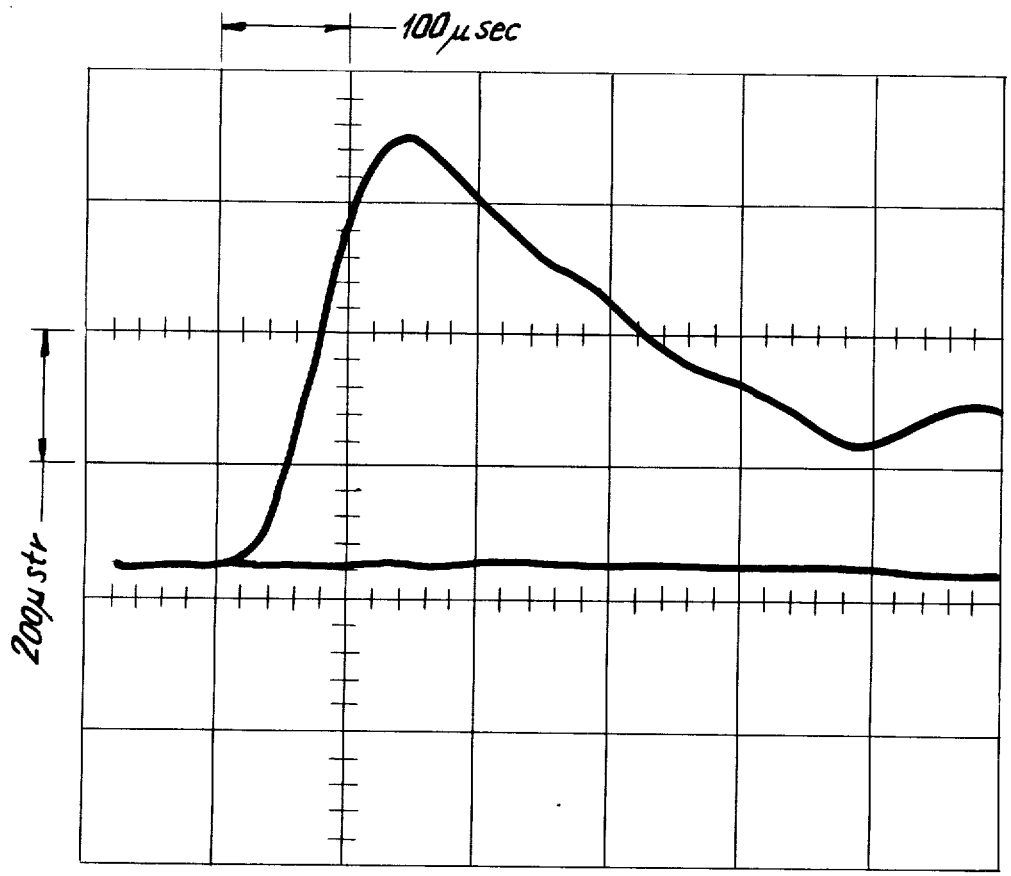

The conditioned stress wave of FIG. 3b has a peak stress ratio ($\sigma_1/\sigma_o$) relative to the stress wave of FIG. 3a, this ratio is dictated by the particular application, including the composition of the pin 18. However, the ratio should not be made higher than the yield stress, $\sigma_y$, of the pin 18, otherwise undesired plastic deformation will result.

The stress wave of FIG. 3b, see also a portion of the stress wave in FIG. 3c, propagates from left to right as a compression wave in the pin 18 with a velocity V, reaches the remote or free end 22 of the pin 18 and reflects as a tension wave with a velocity of 2V outward in the axial direction, see FIG. 2. If the length of the pulse is sufficient, i.e., greater than the length of the pin 18, the entire pin 18 is set in motion with a velocity 2V. This momentum imparted to the remote end 22 of the pin 18 is sufficient to overcome the static forces of friction between the receiving aperture 23 and the pin 18 to drive or draw the pin 18 into the receiving aperture 23. After each discharge of the capacitor bank 28 the pin 18 is partially driven into the aperture 23 by overcoming the frictional forces. Repetitive discharges drive the pin 18 to the required depth (proper position).

An analysis of the one dimensional theory of wave propagation and reflection follows. It is assumed that the plane cross section remains plane during loading, that the stress distribution is uniform across the plane cross section, and that radial inertia may be neglected.

Solution of the momentum equation and the elastic stress strain relationship results in the following equation:

$$s = \rho C_o v \qquad (1)$$

where:

$s$ = stress
$\rho$ = the density of the material
$C_o$ = speed of sound in the material
$v$ = particle velocity of the stress wave in the material Whenever a transient stress wave encounters an area discontinuity or density change, e.g., at the remote free end 22 of the pin 18, the initial stress wave splits into transmitted and reflected waves. The intensity of the transmitted and reflected waves depends on the ratio of the areas and/or the densities across the discontinuity. To derive the equations of velocity and stress for the transmitted and reflected waves we consider equation (1) ($s = \rho C_o v$) and the compatability equations across any discontinuity.

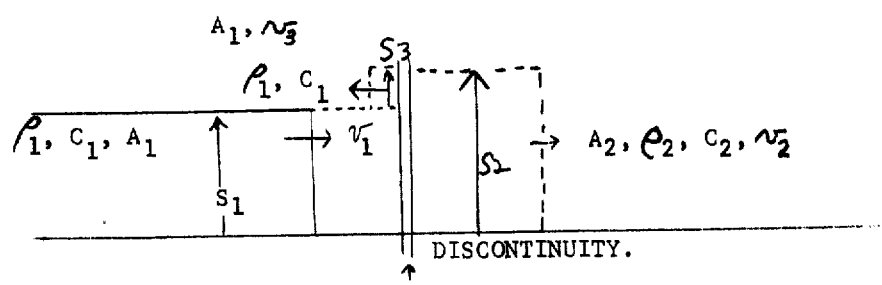

Compatibility equations:

$$V_1 + V_2 = v_3 \text{ velocities are the same.} \quad (2)$$

$$A_1(S_1 + S_3) = A_2 S_2 \text{ Forces are equal} \quad (3)$$

Since $s = \rho c v$, using equation (1) we can obtain:

$$V_1 - V_2 = \left\{ \frac{S_3}{\rho_1 C_1} + \frac{S_1}{\rho_1 C_1} \right\} - \frac{S_2}{\rho_2 C_2}$$

or $(S_1 - S_3) = \frac{\rho_1 C_1}{\rho_2 C_2} S_2 \quad (4)$

From equation (3) we have:

$$(S_1 + S_3) = (A_2 S_2 / A_1) \quad (5)$$

Combining equations (4) and (5) we have:

$$2S_1 = \left\{ \frac{A_2}{A_1} + \frac{\rho_1 C_1}{\rho_2 C_2} \right\} S_2$$

Hence:

$$S_2 = \frac{2S_1}{\frac{\rho_1 C_1}{\rho_1 C_2} \left\{ \frac{A_2 \rho_2 C_2}{A_1 \rho_1 C_1} + 1 \right\}}$$

and $$2S_3 = \left\{ \frac{A_2}{A_1} - \frac{\rho_1 C_1}{\rho_2 C_2} \right\} S_2$$

Hence, $$S_3 = \frac{\left\{ \frac{\rho_2 C_2 A_2}{\rho_1 C_1 A_1} - 1 \right\}}{\left\{ \frac{\rho_2 C_2 A_2}{\rho_1 C_1 A_1} + 1 \right\}} S_1 \quad (7)$$

If $\rho_2 << \rho_1$ (air and steel)

$C_2 << C_1$ (air and steel)

$\frac{\rho_2 C_2}{\rho_1 C_1} \sim 0$

Substituting in equation (7) we obtain $$\boxed{S_3 \cong -S_1} \quad (8)$$

and from equation (4)

$S_2 <<< S_1$

Hence, $V_2 << V_1 \quad (9)$

From equation (2) we obtain:

$$\boxed{v_3 \cong -v_1} \quad (10)$$

Equations (8) and (10) show that the incident wave is reflected with equal and opposite stress (i.e. $S_3 = -S_1$), and with equal velocity ($v_3 = v_1$).

The stress of the incident wave is compressive. Therefore the stress of the reflected wave is tensile (tension). Furthermore, the total particle velocity during reflection is $2v_1$ (twice the incident wave particle velocity).

The kinetic energy resulting from the transmitted stress wave overcomes frictional forces between the pin 18 and the aperture walls to drive the pin 18 into the receiving aperture 23 and complete the joint.

If the peak particle velocity of the incident stress wave is approximately 200 in/sec. Upon reflection the peak particle velocity rises to 400 in/sec. Since the stress wave conditioned in the conditioning means 16 is of long duration, e.g., 1 millisecond, and maintains a high and substantially constant stress level for a substantial portion of the duration of the stress wave, the reflection provides sufficient kinetic energy to overcome the frictional forces of the aperture walls and position the pin 18 within the receiving aperture 23.

It is this high relative velocity between the pin 18 and the walls of the aperture 23 that will in effect create a boundary layer having reduced frictional forces which allows the pin 18 to be drawn into the aperture 23 to secure the joint 34 between members 25 and 27.

It should be understood by those skilled in the art that various modifications may be made in the present invention without departing from the spirit and scope thereof as described in the specifications and defined in the appended claims.

What is claimed is:

1. A process for driving an interference-fit fastener into a receiving aperture having a slightly smaller diameter than the fastener, comprising the steps of:
   a. electromagnetically generating a stress wave having a high particle velocity;
   b. conditioning the high velocity stress wave to control the intensity and length of the high velocity stress wave to provide an output stress wave which maintain a high stress level, the stress level of the conditioned stress wave being less than the yield stress of the interference-fit fastener to prevent plastic deformation thereof, the length of the stress wave being greater than the length of the interference-fit fastener; and
   c. applying the conditioned high velocity stress wave to one end of thee interference-fit fastener causing a tensile elongation in the direction of propagation and contraction at right angles to the direction of propagation, the conditioned high velocity stress wave reflecting from the remote free end of the interference-fit fastener to impart a high velocity to the remote free end of the interference-fit fastener so that frictional forces are overcome and the interference-fit fastener is drawn into the receiving aperture.

2. The process of driving an interference-fit fastener as defined in claim 1 wherein the step of electromagnetically generating a stress wave is through electromagnetic repulsion established by the interaction of a first magnetic field produced by a coil energized by a capacitor bank and a second magnetic field within a driver of suitable conductive material adjacent to said coil.

3. The process of driving an interference-fit fastener as defined in claim 2 wherein the magnetic field within the driver is induced by the magnetic field produced by the coil.

4. The process of driving an interference-fit fastener as defined in claim 3 which further comprises the step of absorbing the recoil forces resulting from generating the stress wave.

5. A tool for driving an interference-fit fastener into a receiving aperture having a slightly smaller diameter than the fastener, comprising:
  a. means for electromagnetically generating a stress wave having a high particle velocity;
  b. conditioning means for controlling the intensity and length of the high velocity stress wave to provide an output stress wave which maintains a high stress level for a substantial portion of the length of the stress wave, the stress level of the stress wave resulting from the conditioning means being less than the yield stress of the interference-fit fastener to prevent plastic deformation thereof, the length of the stress wave being greater than the length of the interference-fit fastener; and
  said interference-fit fastener including a first end for engagement with said conditioning means and a remote end for engagement with the receiving aperture, the conditioned stress wave causing a tensile elongation in the direction of propagation and contraction at right angles to the direction of propagation and reflecting from the remote free end of the interference-fit fastener to impart a high velocity to the remote free end of said interference-fit fastener so that the frictional forces are overcome and the interference fastener is drawn into the receiving aperture.

6. A tool for driving an interference-fit fastener as defined in claim 5 wherein the means for electromagnetically generating a stress wave having a high particle velocity comprises:
  a. an electromagnetic coil;
  b. an energy storage means dischargeable through said coil providing a pulse of limited duration;
  c. a driver coupled to said coil; and
  d. means for establishing an electromagnetic field in said driver whereby a stress wave is generated by the electromagnetic repulsion between the coil and said driver.

7. A tool for driving an interference-fit fastener in claim 6 wherein the means for establishing an electromagnetic field in the driver comprises electromagnetically coupling said driver to said coil.

8. A tool for driving an interference-fit fastener as defined in claim 7 wherein the conditioning means is an exponentially shaped mass coupled to said driver and the various components of the tool are related by the formula:

$$\frac{s}{s_o} = \frac{1}{ct_A n}\left(\frac{A_o}{A}-1\right) + \frac{A_o}{A}$$

where:
  $s$ = the stress delivered to the interference fastener at the small end of the conditioning means;
  $s_o$ = the stress developed at the large end of the conditioning means by the electromagnetic repulsion between the coil and the driver;
  $C$ = the speed of sound in the conditioning means;
  $t_A$ = the time required for the particle velocity to reach a maximum;
  $A_o$ = the cross sectional area of the large end of the conditioning means;
  $A$ = the cross sectional area at the smaller end of the conditioning means;
  $n$ = the number appearing in the exponent of the equation which governs the shape of the conditioning means, i.e. $A = A_o e^{-nx_o}$, where $X_o$ is the length of the focussing means.

9. A tool for driving an interference-fit fastener as defined in claim 7 wherein the conditioning means is a conically shaped mass coupled to said driver and the various components of the tool are related by the formula:

$$\frac{s}{s_o} = \frac{RK}{3ct_A}\left(\frac{A_o}{A}-1\right) + \frac{x_o}{3ct_A} + \frac{A_o}{A}$$

where:
  $s$ = the stress delivered to the interference fastener at the small end of the conditioning means;
  $s_o$ = the stress developed at the large end of the conditioning means by the electromagnetic repulsion between the coil and the driver;
  $R_o$ = the radius of the large end of the focussing means;
  $K$ = the tangent of the angle inscribed by the edge of the conically shaped mass and the base of the conically shaped mass;
  $C$ = the speed of sound in the conditioning means;
  $t_A$ = the time required for the particle velocity to reach a maximum;
  $A_o$ = the cross sectional area of the large end of the conditioning means, i.e. the base of the conically shaped mass;
  $A$ = the cross sectional area at the small end of the conditioning means;
  $x_o$ = the length of the conditioning means.

10. A tool for driving an interference-fit fastener as defined in claim 5 which further comprises a recoil means mechanically coupled to said conditioning means.

11. A tool for driving an interference-fit fastener as defined in claim 6 wherein:
  said energy storage means is a capacitor bank electrically dischargeable through said coil.

* * * * *